United States Patent [19]

Grunwell

[11] Patent Number: 4,783,300
[45] Date of Patent: Nov. 8, 1988

[54] VIBRATING DAMPING MATERIALS AND METHOD FOR CONTINUOUS PRODUCTION

[75] Inventor: Walter Grunwell, Skipton, England

[73] Assignee: Wardle Storeys PLC, Lancashire, England

[21] Appl. No.: 848,348

[22] Filed: Apr. 4, 1986

Related U.S. Application Data

[63] Continuation-in-part of Ser. No. 778,509, Sep. 20, 1985, which is a continuation-in-part of Ser. No. 701,505, Feb. 14, 1985.

[30] Foreign Application Priority Data

Sep. 22, 1984 [GB] United Kingdom ............... 8424048
May 13, 1985 [GB] United Kingdom ............... 8512085

[51] Int. Cl.⁴ .................................... B29C 43/24
[52] U.S. Cl. ................................. 264/175; 264/110; 264/177.17; 264/177.2; 264/211.21; 264/211.23; 264/331.18; 264/349; 425/205; 425/209; 524/449
[58] Field of Search ............... 264/175, 349, 40.4, 264/110, 331.18, 211.21, 211.23, 172.17, 177.2; 425/204, 205, 209, 201, 378 R; 524/449

[56] References Cited

U.S. PATENT DOCUMENTS

| | | | |
|---|---|---|---|
| 2,456,251 | 12/1948 | Boughton et al. | 264/110 |
| 2,698,962 | 1/1955 | Swallow | 425/204 |
| 3,764,456 | 10/1973 | Woodhams | 264/110 |
| 3,984,509 | 10/1975 | Hall et al. | 264/211.21 |
| 3,994,845 | 11/1976 | Blachford | 264/175 |
| 4,025,274 | 5/1977 | Vemura et al. | 264/211.21 |
| 4,282,120 | 8/1981 | Cisterni | 264/349 |
| 4,294,790 | 10/1981 | Thornley | 264/175 |
| 4,385,139 | 5/1983 | Kuchler et al. | 264/175 |

FOREIGN PATENT DOCUMENTS

0011830 6/1980 European Pat. Off.
0100066 2/1984 European Pat. Off.
1310241 3/1973 United Kingdom.

*Primary Examiner*—Jeffery Thurlow
*Attorney, Agent, or Firm*—Leydig, Voit & Mayer

[57] ABSTRACT

Disclosed is a self-adhesive sheet of vibration damping and sound insulating material composed of a vinyl acetate homopolymer material together with a filler, a plasticiser, and a mineral filler in an amount up to 80% by weight wherein the composition comprises not more than 20% micaceous material by weight. The sheet is produced by a continuous process wherein mixing occurs at 170° C. to 190° C. and the continuous sheet is formed at 60° C. to 120° C.

7 Claims, 5 Drawing Sheets

VIBRATING DAMPING MATERIALS AND METHOD FOR CONTINUOUS PRODUCTION

This is a continuation-in-part of our Ser. No. 778,509, filed Sept. 20, 1985, which is a continuation-in-part of Ser. No. 701,505 filed Feb. 14, 1985.

FIELD OF THE INVENTION

The invention relates to the manufacture of vibration damping and sound insulating materials.

BACKGROUND TO THE INVENTION

Coatings of mineral fillers bound with resinous or polymeric materials are commonly used on metal sheet structures to reduce noise, particularly where this arises from the resonant nature of the structure. These coatings are normally termed vibration damping materials and are applied to the required surfaces either as a point or a sheet by means of an adhesive. Such coatings are found also to provide a degree of sound insulation. The sound insulating efficiency of these materials is particularly related to the thermoelastic and viscous properties of the resinous or polymeric binder, but the choice of mineral filler is also important. Polymers of vinyl acetate and related copolymers are known to have exceptionally high internal damping characteristics and are, therefore, a known choice for formulating such materials.

The temperature range over which these materials are effective in providing sound insulation is a function of the softness. The softness of the materials containing vinyl acetate polymers and copolymers is readily adjusted by the use of plasticisers such as are used with nitrocellulose. An example of such a plasticiser is a low molecular weight phthalate plasticiser because they have been found generally compatible with vinyl acetate polymers and copolymers.

Since vinyl acetate polymers and copolymers are readily dissolved in polar solvents, vibration damping materials made from such polymers and copolymers are generally produced as paints for direct application or as solutions for the casting of sheet materials. Some vinyl acetate polymers and copolymers are disperable in water as emulsions which can also be used for the production of vibration damping materials in the form of paints and cast sheets.

Heretofore, however, there has been no successful production of sheets or other profiles of vibration damping materials from mineral-filled vinyl acetate polymers by thermoplastic processing of these polymers, for example by calendering.

U.S. Pat. No. 3,994,845 proposes the production of vibration damping sheets from a mineral-filled vinyl acetate polymer. A formulation of polyvinyl acetate, mica, clay, stearic acid and polyethylene glycol are mixed in a batch mixer and heated to a temperature of from 220° F. (105° C.) to 280° F. (138° C.). The resulting heated mixture is discharged in a batch and then converted into a sheet by passing it through a two roll sheeting mill whose rolls are water cooled.

This process has been found, however, not to be satisfactory for the production of such sheets. In particular, it has been found that the mixture produced by the batch mixer tends to crumble and does not sheet readily. Accordingly, the process of this specification is not suitable for the commercial production.

DESCRIPTION OF THE INVENTION

According to a first aspect of the invention, there is provided a method of manufacturing a polymeric, profiled sheet for vibration damping and sound insulation, comprising the steps of:

(a) feeding continuously to a continuous mixer a polymer material consisting of a vinyl acetate homopolymer, together with a plasticiser, and a mineral filler material in an amount up to 80% by weight of the total composition;

(b) passing said vinyl acetate polymer material, said filler, and said plasticiser continuously through said continuous mixer to produce a homogeneous mixture thereof wherein said materials are well dispersed in said homogeneous mixture;

(c) heating said mixture to a temperature of from 170° C. to 190° C. as said mixture passes through said continuous mixer, (d) continuously delivering said heated mixture from said continuous mixer to heated sheet forming means, said sheet forming means comprising a pair of calender rolls heated to a temperature of from 60° C. to 120° C.;

(e) forming a profiled sheet continuously from said mixture in said heated sheet forming means.

The invention also includes within its scope the vibration damping and sound insulating profiled material when produced by the method of the first aspect of the invention.

BRIEF DESCRIPTION OF THE DRAWINGS

The following is a more detailed description of some embodiments of the invention, by way of example, reference being made to the accompanying drawings in which.

DESCRIPTION OF THE PREFERRED EMBODIMENTS

Figures 1, 2:
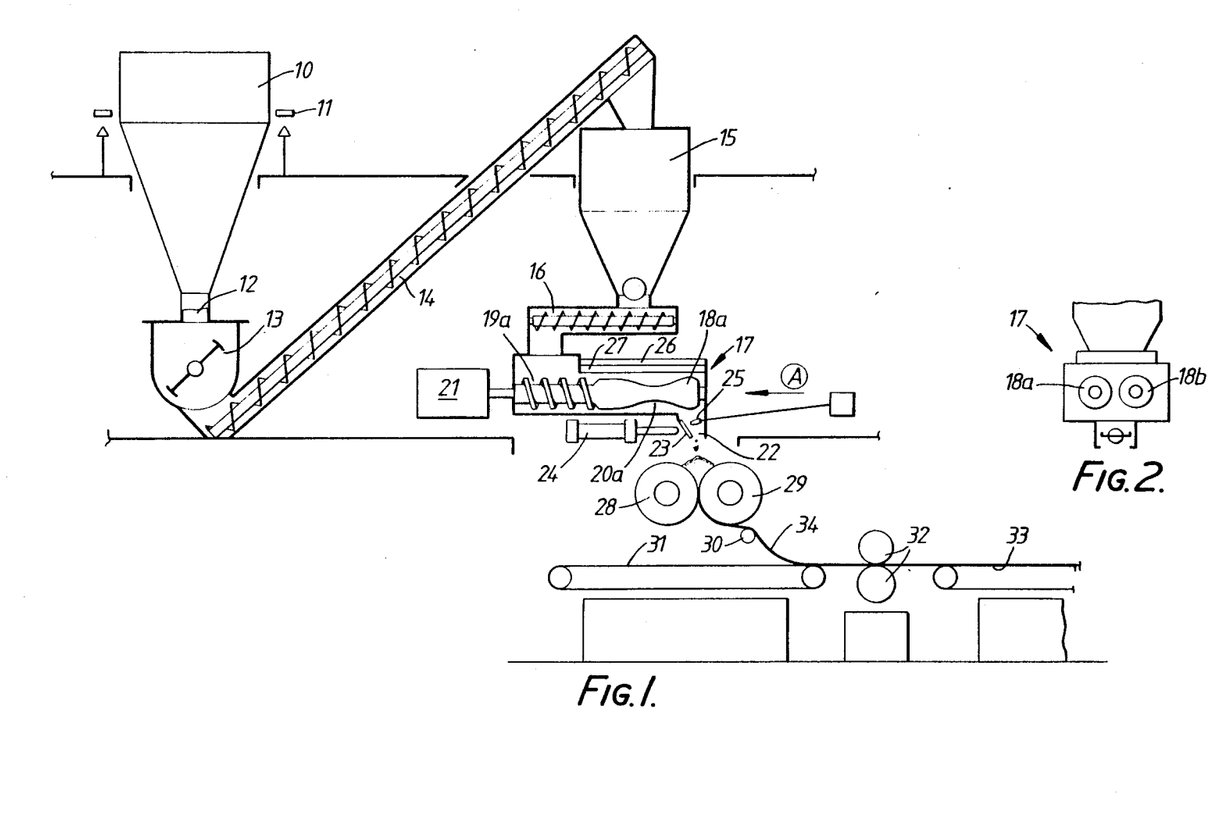
FIG. 1 is a schematic view of an apparatus for the continuous production of a profiled sheet from a vinyl acetate polymer material, a filler and a plasticiser.
FIG. 2 is a schematic end elevation of a continuous mixer of the apparatus of FIG. 1 in the direction of the arrow A in FIG. 1.

Referring first to FIG. 1, the apparatus comprises a hopper 10 provided with a weighing attachment 11 for producing a continuous indication of the weight of the contents of the hopper 10. At the lower end of the hopper 10 there is an outlet 12 which feeds a pre-blender 13 whose outlet feeds an upwardly directed screw conveyor 14. At its upper end, an outlet to the screw conveyor 14 is directed into a feed hopper 15 having a variable speed screw discharge 16 feeding a continuous mixer 17.

The continuous mixer 17 comprises, as best seen in FIG. 2, a pair of rotors 18a, 18b arranged horizontally in side-by-side but spaced relationship. At their inlet ends, the rotors 18a, 18b are provided with respective screw threads, one of which is shown at 19a, while, at their outlet ends, the rotors 18a, 18b are provided with respective waisted annular surfaces, one of which is shown at 20a. The rotors 18a, 18b are driven by a drive 21 capable of varying the rotor speed from 0–300 r.p.m.

An outlet 22 of the continuous mixer 17 is provided with a variable discharge orifice 23 controlled by an actuator 24. A temperature sensor 25 senses the temperature of the exiting mixture. A water jacket 26 and a steam jacket 27 surround the continuous mixer 17.

Two heated calendar rolls 28, 29 are provided beneath the discharge orifice 23. The axes of the rolls 28, 29 are horizontal to form a horizontal nip therebetween. The rolls 28, 29 are steam or water heated.

A guide bar 30 is located beneath the rolls 28, 29 and above a horizontal conveyor 31. Adjacent the discharge end of the conveyor 31 are a pair of laminating/embossing rollers 32 which are followed by a second, cooling, horizontal conveyor 33.

In use, a polyvinyl acetate material, a filler and a plasticiser are loaded into the hopper 10 in predetermined proportions until a required weight is reached, as sensed by the weighing attachment 11. These products are added from time to time during operation to maintain this required weight.

The products are continuously fed from the hopper via the outlet 12 to the pre-blender in which the products are intermixed and fed continuously to the screw conveyor 14, from which they pass continuously to the feed hopper 15. The output of products from the feed hopper 15 is controlled by the variable speed screw discharge 16 which provides a continuous output of mixed product to the continuous mixer 17. In the continuous mixer 17, the temperature of the output is maintained at 170° C.–190° C., as sensed by the temperature sensor 25, by use of the water and steam jackets 26, 27 and by adjustment of the speed of the rotors 18a, 18b, the discharge 16 and the discharge orifice 23.

The heated mixture of polyvinyl acetate material, filler and plasticiser is then delivered continuously to the nip of the calender rolls 28, 28 where the mixture is formed into a sheet 34 which is guided over the bar 30 to the first conveyor 31 on which it is transported to the laminating/embossing rollers 32, where the sheet is profiled. The second conveyor 33 then removes the profiled sheet while it cools.

The following are Examples of profiled sheets produced using the apparatus described above with reference to FIGS. 1 and 2 of the drawings.

EXAMPLE 1

The following are fed to the hopper 10 in the gravimetric proportions shown:
Polyvinyl acetate (PVA) (molecular weight K70): 24%
Butyl benzyl phthalate (plasticiser): 6%
Lubricant: 1%
Slate powder (mineral filler): 53%
Mica (mineral filler): 16%

The selected constituents are blended by the preblender 13 until well dispersed. The blended material is then transferred to the continuous mixer 17 where it is heated to a temperature within the range 170° C. to 190° C.

The heated mixture is then fed to the calender rolls 28, 29. The calender roll temperatures are preferably set at temperatures below that of the heated mass. Typical temperatures would lie within the range 60° C. to 120° C., preferable 60° C. to 80° C.

The gap between the calender rolls 28, 29 is set according to the thickness of sheet required to give a weight of 1 kg/m².

The sheet emerging from the calender rolls 28, 29 is profiled and cooled and either wound into a roll for further processing or cut into panels of a required size. The roll of sheet material may be used directly or converted into self-adhesive rolls or sheets as required.

In one test according to this Example, the blended material was heated to 180° C. in the continuous mixer 17, and fed to a calender with roll temperatures set to 80° C. and 60° C. The calender speed was 10 m/min. The finished sheet was cooled and cut into panels. These panels were tested according to British Standard AU 125:1966. They gave a noise decay rate of 16 decibels/sec at 16° C. The decay rate of a comparable material made by the casting process is 11 decibels at the same temperature.

EXAMPLE 2

A sheet was calendered using the method of Example 1, to a weight of 1.25 kg m$^{-2}$ and a thickness of 0.6 mm, and was tested for suitability as a vibration damping sheet material for use in automobiles.

In both the Examples described above, the mix emerging from the continuous mixer 17 was formed into a sheet by the calender rolls 28, 29 consistently and without difficulty. This allows the production of sheets on a commercial scale.

A primary reason for this is that the method is conducted on a continuous basis at elevated temperatures. While, in general, in plastics processing operations, continuous production is not expected to give any particular benefit, as regards produced properties, in relation to, for example, batch processing, in the present process the use of a continuous process at elevated temperatures (170° C.–190° C.) gives the unexpected benefit that a sheet can be produced on a commercial scale without the use of painting and casting techniques. This is the result of continuous mixing giving a well dispersed and homogeneous material.

Also of significance is the proportion of the clay and micaceous materials in the composition. These should be between 50% and 80% by weight of the total composition, with the micaceous materials not exceeding 20%. Amounts of micaceous material above 20% reduce the hot strength during processing and so increase the difficulties of sheet manufacture.

As will be noted, the molecular weight of the polyvinylacetate used in the composition of these examples is K70, which is regarded as a high molecular weight. Preferably, the polyvinylacetate used in carrying out the present invention will have a molecular weight between K60 and K80. Also, butyl benzyl phthalate is used as the plasticiser, although any suitable phthalate ester or other high solvating plasticiser may be used. As previously mentioned, the amount of plasticiser used depends on the type of vibration damping material to be produced and on the temperature range over which the vibration damping material is required to operate. The amount will normally comprise from 4 to 9 per cent by weight of the total composition.

The properties of the material prepared in accordance with Example 2, and the tests applied, will now be described in detail with reference to FIGS. 3 to 9 of the accompanying drawings.

Assuming that the damping material will be attached to the surface of a vibrating panel, those physical properties important for its function can be highlighted. The basic requirement is for the maximum amount of vibration energy to be removed from the panel, and then as much of that extracted energy as possible to be converted into a less innocuous form, e.g. heat.

Consider the simple case of a single movement of the panel causing static deformation of the damping material. The ratio of the applied stress ($\sigma$) to the resultant strain ($\epsilon$) defines the materials's Elastic Modulus (E)

or $\sigma = E\epsilon$

Thus to maximise the stress necessary to produce deformation, and hence maximise the panel energy utilised, the damping material must have a high Elastic Modulus.

When dynamic loading is applied to the material, in the form of vibratory movement, internal friction (viscous loss) resists the existing force. To take this into account the Modulus of Elasticity must be expressed in complex form, i.e.

$$E^* = E' + jE''$$

where
E* = Complex Modulus of Elasticity
E' = Elastic Modulus
E'' = Loss Modulus
$j = \sqrt{-1}$ The material loss factor $\eta$ which is a property that can be readily measured, is defined as the ratio E''/E' and so that above expression can be re-written $$E^* = E'(1+j\eta)$$

It is now obvious that not only is it important for the damping material to possess a high Elastic Modulus but also its Loss Modulus or Loss Factor must be high in order to maximise energy conversion through internal friction. Materials of this type are termed visco elastic.

Under certain conditions PVA exhibits the required visc-elastic nature.

Like most plastics, PVA undergoes phase changes as its temperature is increased. At low temperatures it is hard and brittle like glass. Above a certain temperature, namely the freezing point, it gradually softens, but still retains the character of a solid material through a temperature range known as the "transitional phase". As the temperature is increased further it becomes extremely weak and takes on a rubber behavior until finally it begins to flow freely and becomes liquid in the real sense of the term.

In the transitional phase the material remains tough and displays viso-elastic properties. When it is deformed and hence stressed (the Elastic Modulus determines the magnitude of the stress) molecular rearrangement processes take place to reduce the stress, whilst the deformation remains constant. This causes a large part of the molecular energy to be converted into heat. (The Loss Modulus is a measure of the material's capability for energy conversion).

Figure 3:
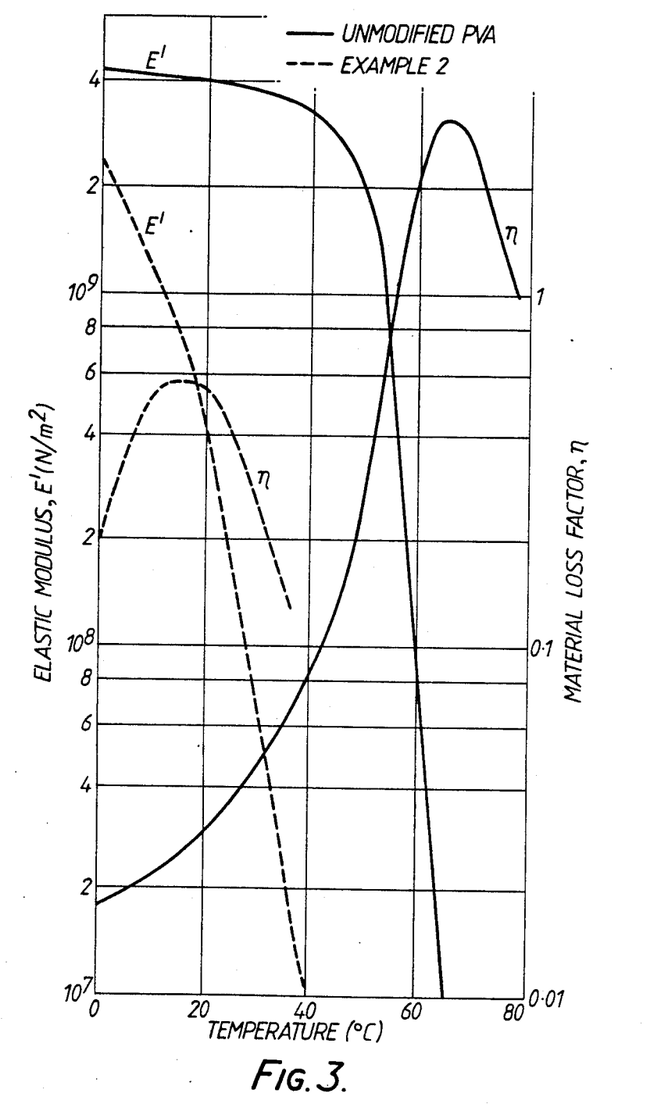
FIG. 3 is a graph of the vibration with temperature of elastic modulus and material loss factor of unmodified PVA and of a profiled sheet produced in accordance with Example 2 below.

FIG. 3 shows the variation in Elastic Modulus and Loss Factor for unmodified PVA, as a function of the main influencing parameter, namely temperature. The "transitional phase" is symbolised by the sharp fall off in Elastic Modulus (a sign of progressive softening) and the rise in Loss Factor which passes through a maximum. Maximum effect as a vibration damping material is at temperatures where both Elastic Modulus and Loss Factor are high, i.e. between 50° C. and 60° C. PVA alone is of little practical use since not only is the effective temperature range very narrow, it does not contain the normal environmental temperatures encountered in the end use.

Fortunately, the position and size of the effective region can be modified to a great extent through the selected use of plasticisers and fillers. Plasticising serves to lower the temperature range over which the transitional phase predominates. It can also have the effect of expanding the phase i.e. making the decline in Elastic Modulus more gradual and broadening the Loss Factor Medium. The latter effect can be intensified with the addition of fillers. However, the maximum value of Loss Factor decreases as the breadth of the peak increases, so there is a compromise between maximum damping and breadth of the effective temperature range.

The formulation of Examples 1 and 2 is tailored to give maximum damping at normal room temperatures. FIG. 3 gives the variation with temperature of Elastic Modulus and Loss Factor of this material. The effect of additives on the PVA can be seen clearly by comparison with the curves for the basic polymer. The high values of Elastic Modulus and Loss Factor in the range 0°-30° C. show the suitability of the standard product as a vibration damping material for ambient conditions. Other temperature ranges could be catered for by developing the formulation accordingly.

A fundamental requirement of a vibration damping material is a measure of its performance, so that a judgement can be made of its effect in situ. It is important to realise, when considering the fitted performance, that the effectiveness of a vibration damping material is not only decided by the characteristics of the product itself, it also depends on the panel to which it is attached. It can be influenced by the inherent damping of the panel, in that a particular material will have a greater effect in reducing vibrations in a very lightly damped panel than in one already possessing some degree of damping. The performance is also dependent on the mode of vibration or mode shape of the panel under operating conditions.

A damping material, because its energy absorbing action is related to flexural stressing, will be more effective the more pronounced the mode shape of the panel. (The mode shape is dictated by panel geometry and boundary conditions). Following on from this point, if the panel is only partially covered with damping material, its performance can be affected by its position relative to the panel mode shape, i.e. better results will be achieved if it covers all areas of maximum flexure, than if it is situated near nodal points.

Thus, although the elastic modulus and loss factor of the vibration damping material may be known, corresponding to the appropriate frequency and temperature range, this can not be regarded as a measure of its performance when attached to a panel. It is possible, in very simple cases, to determine the fitted performance theoretically. Such calculations form the basis of laboratory determinations of loss factor and elastic modulus for non-rigid materials. These materials, Example 2 being an example of the type, are tested when attached to steel bars of simple geometry. However, the geometry and boundary conditions of a typical automobile body panel are far from simple and thus the only accurate method of determining the performance of combined panel and damping material is by direct measurement of the composite response.

In order to establish standard performance specifications, and examine the relative effectiveness of different materials, it is necessary to have readily reproducable laboratory tests. Many such tests exist, each one highlighting a particular aspect, e.g. speed of testing, suitability for specific material types, ability to measure variation in performance with frequency/thickness/temperature etc. The sample configurations and test methods can each be divided into two categories:

Sample Configuration (a) Sample attached to a metal plate vibrating at a specific resonant frequency while supported at nodal points.

(b) Sample, either alone or in the shape of the bar, or attached to a metal bar, clamped at one/both ends, enabling measurements to be made over a range of resonant frequencies.

Test Method (a) Decay Rate Method: An external exciting force at resonant frequency is removed and the decay in vibration amplitude measured, in dB/sec.

(b) Frequency Response Method: A variable frequency sinusoidal force is applied to the sample and the amplitude of vibration is plotted as a function of frequency. The Loss Factor for a particular natural frequency is found from the position and width of the resonant peak.

Decay Rate and Loss Factor are related as follows:

$$\eta = D/8.7 \pi f$$

where
D=decay rate (dB/sec)
f=resonant frequency (Hz).

Brief details of three standard tests will now be given.

Figure 4:
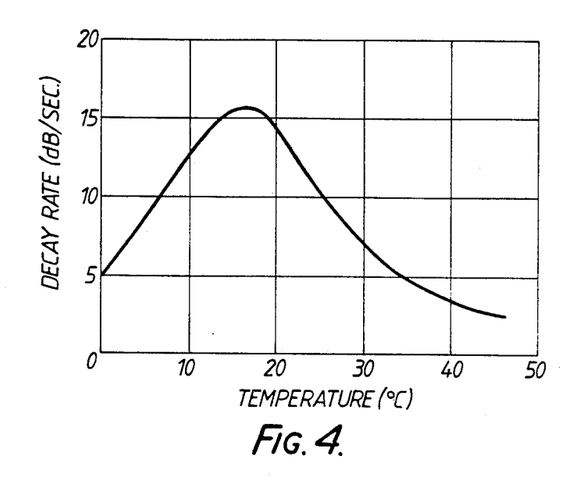
FIG. 4 is a graph of decay rate against temperature of said profiled sheet of said Example 2, in accordance with a standard bar test.
Figure 5:
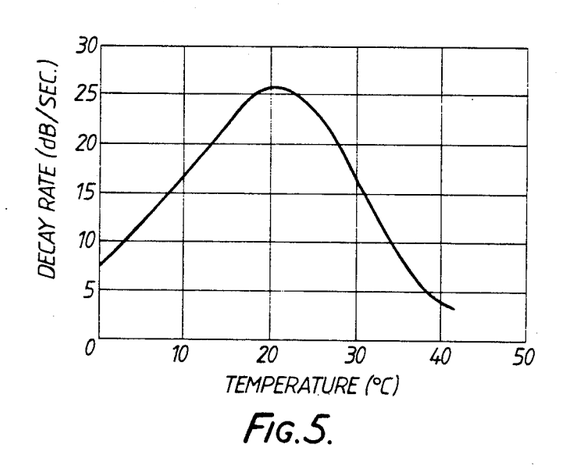
FIG. 5 is a graph of decay rate against temperature of said profiled sheet of said Example 2, in accordance with a Geiger plate test.

BAR TEST (BSAU 125)—This test involves the measurement of the decay rate of a 0.25 in (6.4 mm) thick steel bar, with damping material attached, supported at nodal points at its fundamental frequency of 100 Hz. The variation in decay rate with temperature can be obtained by placing it in an environment cabinet. FIG. 4 is a plot of decay rate versus temperature for bar plus the material of Example 2 (self adhesive). The curve has a broad peak with a maximum decay rate of 16 dB/sec., occurring at around 18° C.

GEIGER PLATE TEST—The arrangement is very similar to the Bar Test except that the panel to which the damping sheet is attached is a 20 in (50.8 cm) square plate, with a resonant frequency of around 160 Hz. Test results are given in FIG. 5. The absolute values of decay rate differ from FIG. 4 because of the different plate geometry, however the shape of the performance curve with respect to temperature is very similar.

COMPLEX MODULUS TEST —This applies the Frequency Response Method of measurement is a vertical specimen clamped at its upper end. The test is more versatile than the others described, since it enables damping measurements to be made over a range of frequencies as well as temperatures. It also uses a thin substrate, which could be considered more typical of an automobile body panel. In order to obtain generally representative data for Example 2, a "mean" bar size was chosen of 280 mm × 10 mm × 1 mm. This also fails within the guidelines given in the only standard Test Method that could be found, namely ASTM E756-80. The tests, on self-adhesive material according to Example 2, were carried out according to this Method, with a test bar of mild steel.

Figure 6:
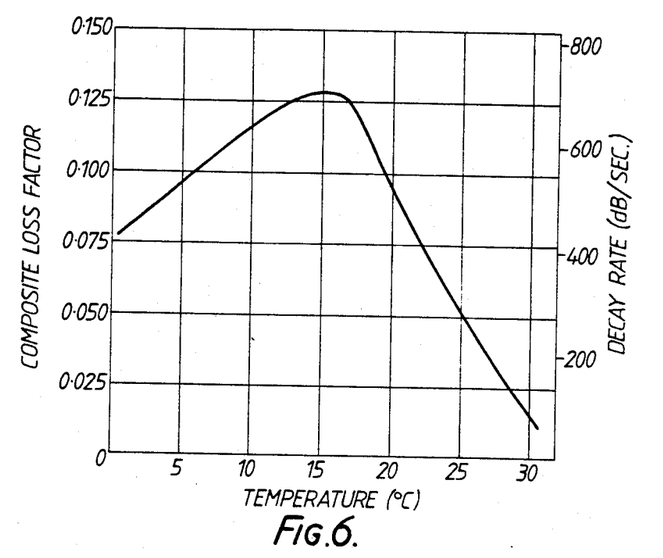
FIG. 6 is a graph of composite loss factor against temperature of said profiled sheet of said Example 2, in accordance with a complex modulus test.

FIG. 6 is a plot of Composite Loss Factor Versus temperature. The equivalent Decay Rates have been marked on the vertical axis. A broad peak is again observed. The asbolute performance is very much higher than in the results from the Thick Bar and Geiger Plate. This is mainly due to the damping sheet thickness being much greater, relative to that of the substrate bar, in the Complex Modulus Test.

Figure 7:
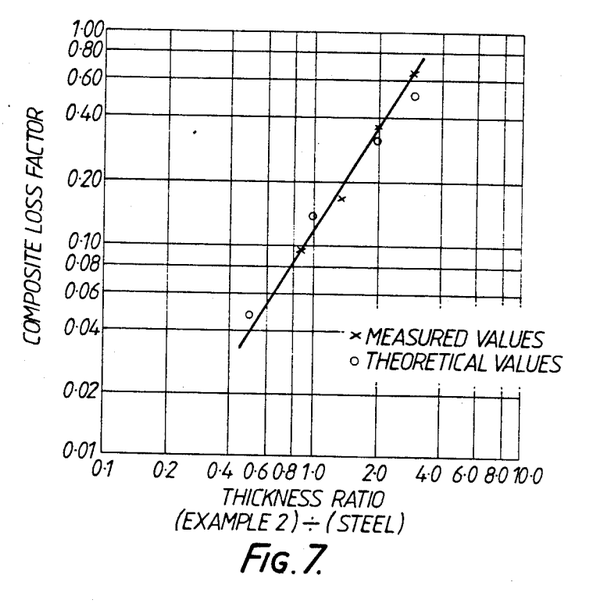
FIG. 7 is a graph of composite loss factor against the ratio of the thickness of sheet material of said Example 2 to the thickness of steel to which it is bonded, at 20° C. and 200 Hz.

The importance of thickness ratio can be seen in the following expression, which comes from the classical analysis for bars, making appropriate assumptions and ignoring very small terms.

$$\eta_c = \eta_1 \cdot \frac{MT(3 + 6T + 4T^2)}{1 + MT(5 + 6T + 4T^2)} \quad (1)$$

where
$\eta_c$=Composite Loss Factor (damping material +bar)
$\eta_1$=damping material Loss Factor
M=Elastic Modulus ratio $-E_1/E$
$E_1$=Elastic Modulus of damping material
E=Elastic Modulus of bar
T=Thickness Ratio=$H_1/H$
$H_1$=damping material thickness
H=bar thickness The relationship between Composite Loss Factor and damping sheet/bar thickness ratio was determined experimentally by testing various thicknesses of the material of Example 2. The result is shown in FIG. 7. That predicted by expression (1) is also plotted, and as might be expected, there is close agreement.

The effect of vibration frequency on Composite Loss Factor was investigated by carrying out measurement of different resonances of the bar. This was done at four temperatures and the results are presented graphically in FIG. 8.

Figure 8:
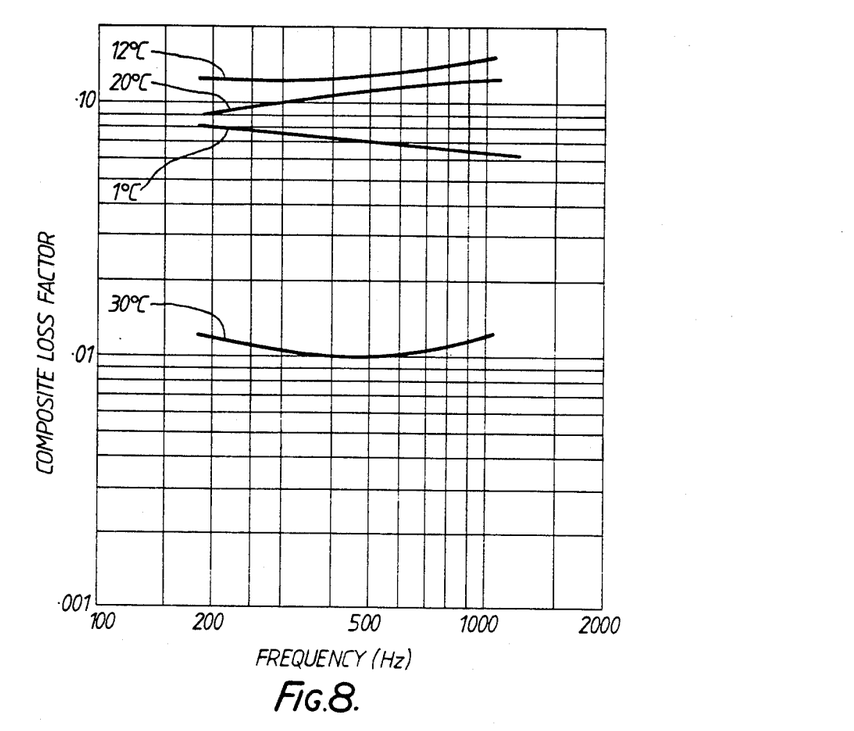
FIG. 8 is a graph of composite loss factor against frequency of vibration (hz) of said profiled sheet of said Example 2.

It can be seen that over normal operating conditions the performance of the material of Example 2 is fairly independent of frequency.

For maximum effect when fixed directly to a panel, a damping material should undergo the same flexural strains as the panel surface. The fixing method will thus affect composite damping performance, since any deformation taking place within an adhesive layer will reduce the strain produced in the damping sheet.

Figure 9:
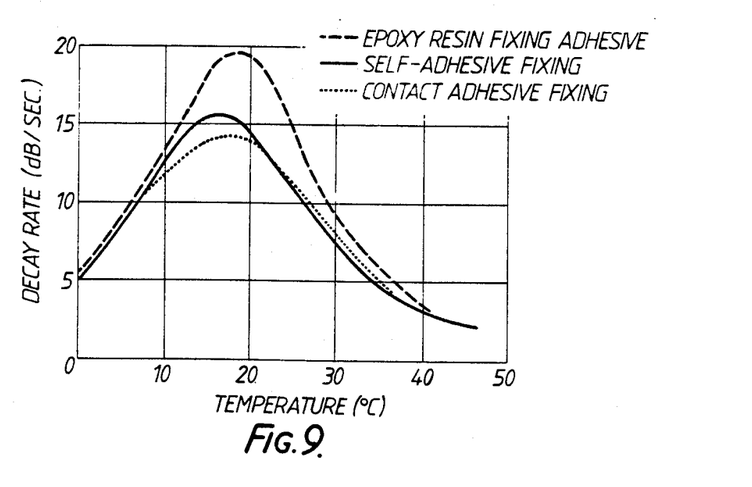
FIG. 9 is a graph of decay rate against temperature for different methods of fixing of said profiled sheet of said Example 2, illustrating the effect of the fixing adhesive.

The effect of the type of adhesive fixing used with the material of Example 2 was examined with the Standard Bar Apparatus. FIG. 9 gives Decay Rate as a function of temperature, using three types of adhesive systems. As might be expected, highest results were achieved with a structural type of adhesive (epoxy resin), with the semi-solid contact type adhesive and the standard pressure sensitive self-adhesive giving similar results.

Thus in terms of obtaining the ultimate performance from the material the adhesive fixing system should be as stiff as possible. However, when considering practical fixing methods for automotive applications, self-adhesive systems are most highly rated. In the case of Example 2, its inherent performance is such that high Decay Rates are achieved even in its self-adhesive form.

The material of Example 2 effectively damps out resonant vibrations in the gauge of metal used for most automobile body panels e.g. doors, roof, wings, bonnet (hood) and boot (trunk) lids etc. On thicker panels, like a floorpan, or in areas where the level of vibration is particularly high, a slightly thicker sheet may be required (1 mm thickness, 2.0 Kg/m$^2$ weight).

Complete coverage of a panel is not necessary. A small pad located near the centre of the unrestrained area is usually sufficiently effective.

Because of its lightness, the form of sheet material which offers most potential in the automobile industry is in conjunction with a self-adhesive fixing system. This eliminates the need for a separate, usually solvent based, adhesive. It enables parts to be easily fitted to vertical surfaces, or to the underside of horizontal surfaces, and gives a permanent bond without any post curing. Using a high temperature self-adhesive system, parts can be fitted prior to initial paint stoving if necessary, where body panels might be more easily accessible than on the final assembly line.

PVA is a thermoplastic material and as such, when laid on horizontal surfaces, sheets will tend to conform to underlying contours when hot. An investigation using the material of Example 2 and a hot melt adhesive, produced samples conformed to a swaged panel with heating conditions of 190° C. for 5 mins.

As stated previously, modified PVA is non-toxic and therefore safe for use in the applications discussed above.

I claim:

1. A method of manufacturing a polymeric, profiled sheet for vibration damping and sound insulation, comprising the steps of:
    (a) feeding continuously to a continuous mixer a polymer material consisting of a vinyl acetate homopolymer, together with a plasticiser, and a mineral filler material in an amount up to 80% by weight of the total composition;
    (b) passing said vinyl acetate polymer material, said filler, and said plasticiser continuously through said continuous mixer to produce a homogeneous mixture thereof wherein said materials are well dispersed in said homogeneous mixture;
    (c) heating said mixture to a temperature of from 170° C. to 190° C. as said mixture passes through said continuous mixer;
    (d) continuously delivering said heated mixture from said continuous mixer to heated sheet forming means, said sheet forming means comprising a pair of calender rolls heated to a temperature of from 60° C. to 120° C.; and
    (e) forming a profiled sheet continuously from said mixture in said heated sheet forming means.

2. A method according to claim 1, in which the vinyl acetate homopolymer has a molecular weight between K60 and K80.

3. A method according to claim 1, in which the plasticiser is a high solvating plasticiser.

4. A method according to claim 3, in which the plasticiser is a phthalate ester.

5. A method according to claim 1, in which the weight of plasticiser is from 4% to 9% of the weight of the total composition.

6. A method according to claim 1, in which the filler is a mixture of clay and micaceous minerals in a content by weight in the total composition from 50% to 80%, the micaceous materials not exceeding 20%.

7. A method according to claim 1, in which the feeding step comprises feeding the following constituents to the mixer:
24 (%) wt. % polyvinyl acetate homopolymer;
6 wt. % butyl benzyl phthalate, as the said plasticiser;
1 wt. % lubricant;
53 wt. % slate powder, as part of said filler; and
16 wt. % mica, as the remainder of said filler.

* * * * *